(No Model.)
T. A. CLAYTON.
PROCESS OF EXTRACTING OIL FROM GARBAGE.
No. 548,958. Patented Oct. 29, 1895.
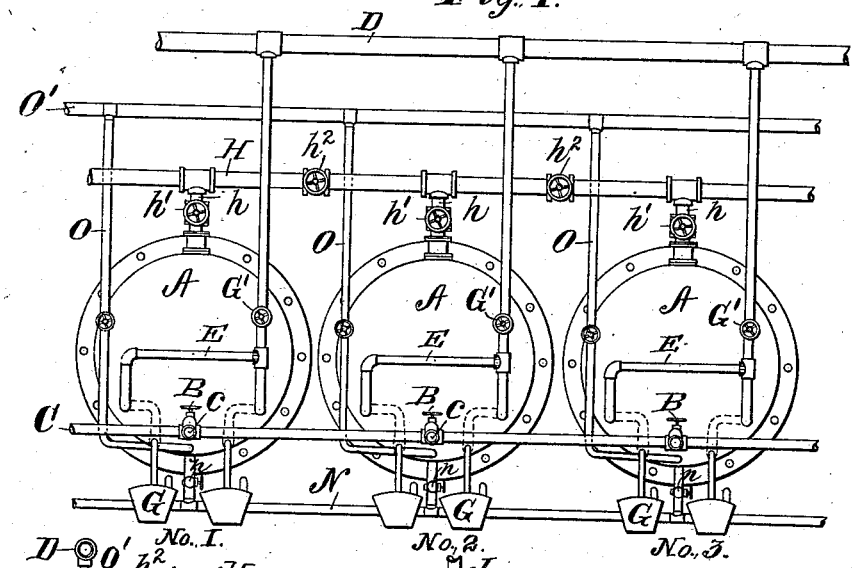
Fig. 1.
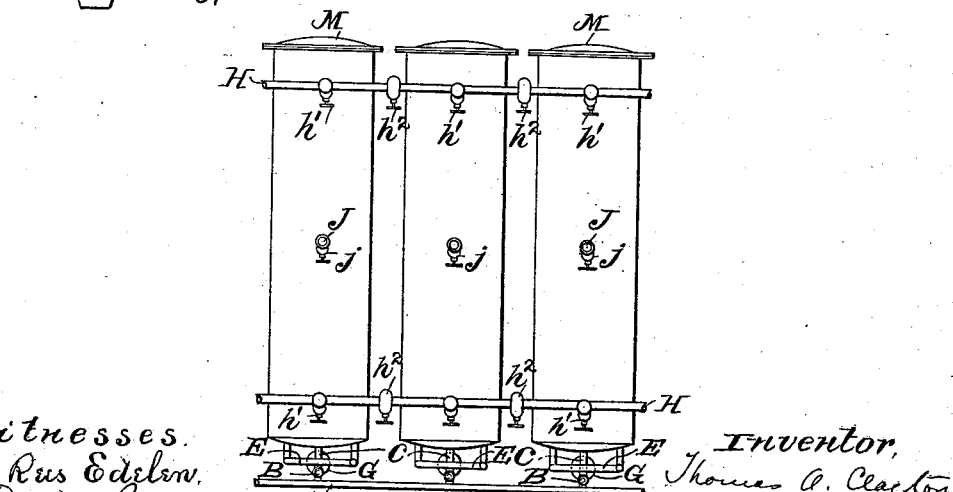
Fig. 2.
Fig. 3.
Witnesses.
W. Rus Edelen.
Geo. Lewis.
Inventor,
Thomas A. Clayton.
by Edward Mauro
his attorney.

UNITED STATES PATENT OFFICE.

THOMAS A. CLAYTON, OF NEW ORLEANS, LOUISIANA.

PROCESS OF EXTRACTING OIL FROM GARBAGE.

SPECIFICATION forming part of Letters Patent No. 548,958, dated October 29, 1895.

Application filed April 24, 1895. Serial No. 547,000. (No model.)

*To all whom it may concern:*

Be it known that I, THOMAS A. CLAYTON, of New Orleans, Louisiana, have invented a new and useful Improvement in the Process of Treating Garbage, which improvement is fully set forth in the following specification.

The present invention has reference to processes of treating garbage, and particularly to processes similar to that described in Patent No. 466,579, granted January 5, 1892, to C. F. and I. M. Simonin.

To succeed commercially in the treatment of garbage or swill for the recovery of fats, oils, &c., therefrom, it is well understood that the greatest precaution must be exercised to prevent unnecessary loss or waste of the reagent and expenditure of heat and to reduce to a minimum the cost of carrying on the process.

In the process described in the patent above referred to, the naphtha or other suitable gas generated in the extractor (the steam-coil being located in the latter as this apparatus is now being practically operated) is conducted to the condenser at a high temperature, or, in other words, before its efficiency as a reagent has been exhausted. Under such circumstances it has been found necessary in practice to charge the extractor with liquid naphtha on an average of eight times in order to effect a proper extraction of the water and grease from the garbage. Calculating that it takes half an hour to pump the extractor full of naphtha, it will be seen that for each charge of garbage in the extractor four hours will be consumed in pumping alone. It will be obvious that in a plant where a number of extractors are employed there will be a large waste of time (requiring more apparatus than would otherwise be necessary) and heat consumed in generating naphtha-gas which is allowed to escape before its efficiency is fully exhausted.

The object of the present invention is to obviate loss from causes such as explained above, as well as to increase the efficiency of the apparatus in other respects. To this end, instead of operating the extractors independently and connecting each separately with a condenser, I employ a series of extractors, so connected that the gas generated in one can circulate through the others in regular sequence, or some of the extractors may be cut out at any stage of the treatment, at the will of the operator, or other connections may be effected, as will be hereinafter referred to.

With such an arrangement the naphtha-gas generated in one extractor can be conducted through the others in the series or circuit, in which it operates upon the contents thereof, being finally carried to the condenser at a comparatively low temperature, requiring but a small condensing-surface to liquefy it, and greatly reducing the danger of loss of naphtha by faulty condensation.

My improved process will be fully described in detail with reference to the accompanying drawings, in which—

Figure 1 illustrates a series of three extractors arranged and connected in accordance with my invention. Fig. 2 is a sectional elevation thereof, and Fig. 3 is a top plan view.

Referring to the drawings, A A A (Nos. 1, 2, and 3, respectively,) represent a series of extractors for receiving the garbage to be treated.

C is a pipe for conducting the liquid naphtha, having a branch $c$ to each extractor, (that portion of said branch lying within the extractor being preferably perforated, so as to deliver the reagent in sprays along the full length of said extractor,) in which branch is located a cut-off valve B.

E is a bifurcated steam-coil in each extractor, fed from a suitable main D, the water of condensation draining therefrom into a suitable receptacle G. A valve G' serves to cut off said coil from the main D.

H H are pipes extending transversely above the opposite ends of the extractors, being connected with each by branches $h$ $h$, in which are located valves $h'$ $h'$ for closing communication with the extractors. In the pipes H H, between each extractor I place valves $h^2$ $h^2$, which are manipulated in establishing the desired connections, as hereinafter explained.

Extending to each extractor is an exhaust-pipe J, having a cut-off valve $j$ for conducting the gas therefrom to the condenser. (Not shown.)

M is a movable head on each extractor through which the garbage, &c., is introduced and N represents a draw-off pipe for each extractor, having a valve n, through which the water or liquefied reagent, with the fats, grease, &c., in solution, can be conducted to any suitable receptacle in which it receives subsequent treatment.

O O O are steam-pipes leading into the extractors from a main O' independent of the main D, that portion of said pipes O lying, respectively, within the extractors (along the bottom thereof) being perforated, through which perforations superheated steam is introduced into the extractors for the purpose of drying out the naphtha from the refuse of the garbage, &c., after the operation of extracting the grease, &c., is completed. This pipe can also be used for the purpose of generating heat and gas in the extractors, either alone or in conjunction with the closed coils E.

The operation is as follows: The extractors having been charged through heads M with garbage, valve B is opened and liquid naphtha introduced into extractor No. 1 from pipe C, valves $h'$ $h'$ being so manipulated as to open communication through the pipes H and branches $h$ between the front ends of extractors Nos. 1 and 2 and the rear ends of extractors Nos. 2 and 3. The valve G' to the steam-coil G of extractor No. 1 is now opened, and the heat thus generated by steam passing therethrough from main D raises the temperature of the mixture of garbage and solvent in extractor No. 1, gradually vaporizing the naphtha, which passes off into extractor No. 2, where it is at first condensed by the lower temperature of the contents thereof, being, however, finally raised to the vaporizing point by the continued flow of the gas. This operation is repeated in extractor No. 3, (and the remaining extractors, where more than three are employed,) the gas being finally conducted to a suitable condenser through the exhaust-pipe J (valve $j$ being open) of extractor No. 3 at a low temperature, in which condition it can be readily condensed without danger of loss of naphtha from faulty condensation, and with a small condensing-surface, as before stated. I thus cause one charge of naphtha to work on the charges in a series of extractors before allowing it to pass to the condenser, while the vaporizing heat is supplied from one steam-coil instead of three, as would be requisite in the Simonin system. After the treatment has continued for a sufficient period, the water (constituting a large part of garbage and which has been displaced by the reagent) and the liquefied naphtha, with the fats, grease, &c., in solution, are drawn off through the draw-off pipe N by opening valve n, to be separated by subsequent treatment, which it is not here necessary to explain.

If I find that the contents of extractor No. 1 are sufficiently treated before those of No. 2, I can cut it out by closing valves B, G', $h$, $h'$ (between condensers Nos. 1 and 2) corresponding therewith and use extractor No. 2 as the first of the circuit; or if I find that the contents of one of the extractors in the middle of the circuit are sufficiently treated before those of the others—which is quite likely, as garbage varies in its composition so much that there is no regular period of treatment—I cut it out by manipulating the proper valves. Again, if I find—say in a plant where nine extractors are operated in series—that the heat generated in No. 1 will not carry the gas beyond extractor No. 4, for instance, and that the naphtha condenses therein, I open valve G' of steam-coil G in extractor No. 4 and revaporize the naphtha until the proper temperature is reached, which varies with circumstances; but in any case the naphtha is required to do service in every extractor in the circuit.

It will be observed that in a system such as herein described some of the extractors can be cut out of circuit and refilled while the treatment in others is being carried on, thus making the operation practically continuous.

Having thus described my invention, what I claim as new, and desire to secure by Letters Patent, is—

In a process for treating garbage or swill for the purposes specified, the improvement consisting in placing the garbage in a series of vessels or extractors, introducing a liquid reagent or solvent into one of said vessels, heating the contents of said vessel to a temperature sufficient to volatilize the reagent or solvent, successively passing the same in such gaseous form through the other vessels until condensed in one of the vessels by lowering of its temperature through contact with the garbage therein, heating the contents of said vessel until the reagent is again volatilized and finally passing it through the remaining vessels or extractors in such gaseous state, substantially as described.

In testimony whereof I have signed this specification in the presence of two subscribing witnesses.

THOMAS A. CLAYTON.

Witnesses:
L. DEDEL,
JOSEPH MAILLE.